April 3, 1962 H. BRICOUT 3,027,973
REVERSING VALVE
Filed July 18, 1960 3 Sheets-Sheet 1

Inventor:
Henri Bricout
By Ernest Montague
Attorney

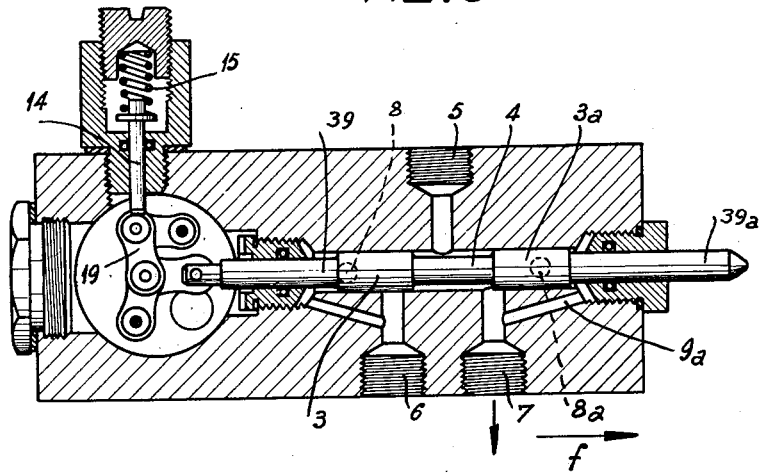
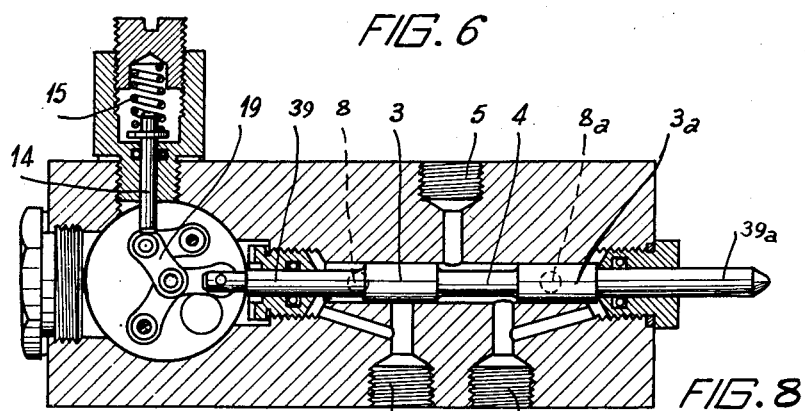
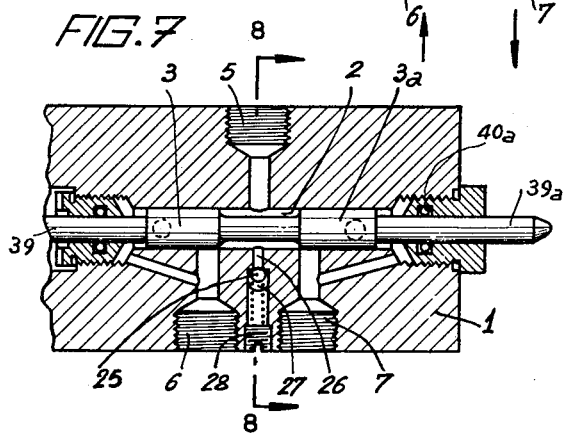
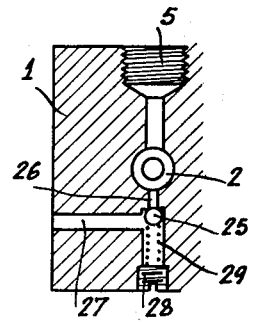

April 3, 1962 H. BRICOUT 3,027,973
REVERSING VALVE
Filed July 18, 1960 3 Sheets-Sheet 3
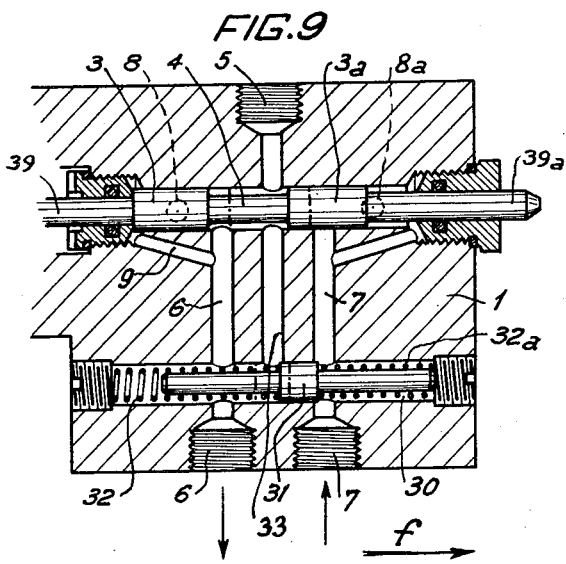
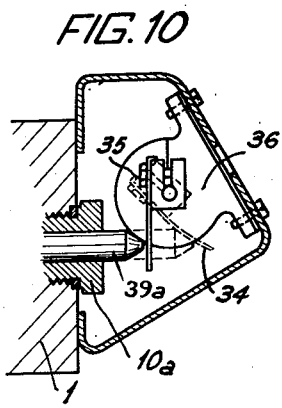
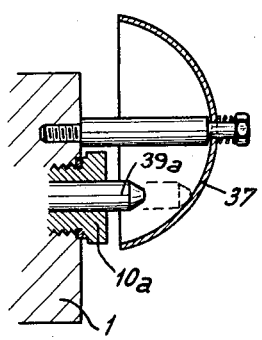
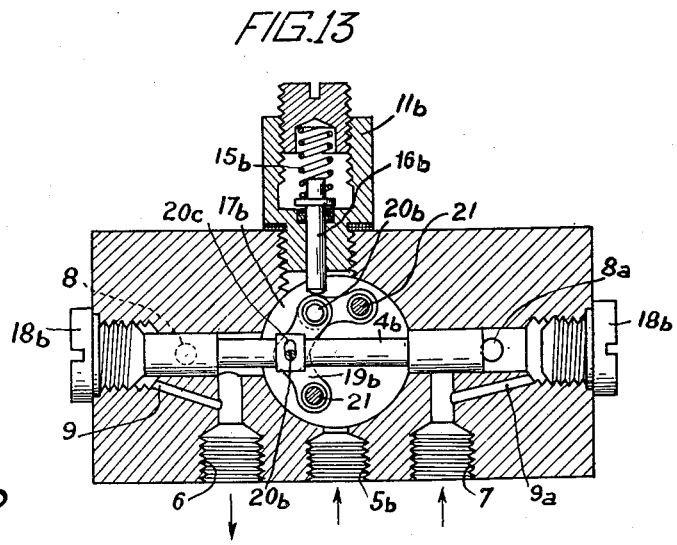
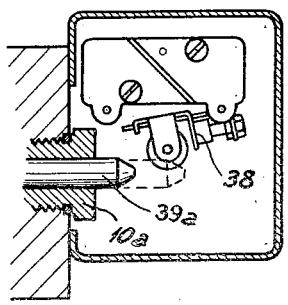

United States Patent Office 3,027,973
Patented Apr. 3, 1962

3,027,973
REVERSING VALVE
Henri Bricout, Meudon, France, assignor to Etablissements Georges Martin, Levallois-Perret, France, a corporation
Filed July 18, 1960, Ser. No. 43,393
Claims priority, application France Aug. 1, 1959
6 Claims. (Cl. 184—7)

The present invention relates to automatic reversing valves for two-line central lubrication systems.

It is well known, in two-line central lubrication systems under pressure, to use a reversing member for alternately delivering lubricant under pressure from the pump outlet to each of the two distributor lines. Actually, this reversing device or inverter (which may be controlled manually or automatically), irrespective of its form of embodiment, consists of a multiple-way valve whereby each line is alternately connected with the supply of lubricant under pressure, while the other line is connected to the reservoir.

In practice the manual control is difficult to apply for it implies for the operator an exact knowledge of the operation of the system, in that it is up to him to determine the exact moment when the inversion must take place, with the assistance, for example, of a pressure-gauge, or by feeling the resistance encountered by the pumping action in the system, etc.

The automatic control, from which a more reliable operation may be expected, is attended however by the inconvenience of requiring as a rule rather complicated and, therefore, costly devices. Some of the known devices control the mechanical and automatic operation of the inverter after a predetermined number of pump revolutions or strokes. In other known arrangements a predetermined overpressure in the feed lines is transmitted to a pilot slide-valve communicating in turn this overpressure to one or the other end face of the reversing device proper. In certain cases and in devices of this character the overpressure action is twofold, for it is taken not at the pump outlet but from each of the two feed lines; however, this method implies a double adjustment and increases the constructional complexity. In other known devices, overpressures are used for actuating electrical contacts energizing in turn electromagnets controlling the operation of the reversing device.

It is one object of the present invention to provide a reversing device of the type broadly set forth hereinabove for a two-line central lubrication system, which ensures the reversing action through relatively simple means and can be readily adapted to all pump types, whether a manual or automatic control type is used.

It is another object of the present invention to provide an automatic feed inverter for two-line central lubrication systems which are of the slide-valve type, wherein the slide valve is movable by translation in its axial direction, comprises only two piston-forming portions and is attached to a single gauged spring through the medium of a simple transmission constituting a toggle, the spring acting in opposition to the slide valve and urging the latter for movement as a function of the feed overpressure, the adjustment of the spring acting upon both lines of the system. A specific feature of the device constituting the subject-matter of the present invention is that the intermediate toggle between the slide valve and the spring consists of a particularly simple arrangement comprising several links of a roller chain which are pivotally interconnected, the end links being pivoted about fixed pins.

It is another object of the present invention to provide an inverter which comprises a safety device for protecting the assembly against excessive pressure surges which are likely to interfere with the proper operation of the inverter or of the system itself, and even to damage them.

It is still another object of the present invention to provide an inverter, wherein, in case the rod carrying the piston-forming portions of the slide valve emerges from the device, the axial movements of this rod may be used for actuating a device for either warning the user that the inversion has actually taken place, or recording this inversion.

With these and other objects in view, the present invention resides in the novel arrangement and combination of parts and in the details of construction hereafter described and claimed, it being understood that changes in the precise embodiment of the present invention herein disclosed may be made within the scope of what is claimed without departing from the spirit of the present invention.

Other objects and advantages will become apparent from the following description taken in conjunction with the accompanying drawings, in which:

FIGURE 1 is a longitudinal axial section of an inverter constructed according to the present invention;

FIGS. 2 and 3 are sections taken along the lines 2—2 and 3—3 of FIG. 1, respectively;

FIGS. 4, 5 and 6 are the same sectional views as discussed in FIG. 1, but showing the reversing device at successive stages of its operation;

FIG. 7 is a fragmentary longitudinal axis section of an embodiment of the safety device applicable to an inverter according to the present invention;

FIG. 8 is a sectional view taken along the lines 8—8 of FIG. 7;

FIG. 9 is a longitudinal axial section of another embodiment of the safety device;

FIGS. 10, 11 and 12 are diagrammatic longitudinal sections showing different means of utilizing the slide-valve rod for controlling the inversion recording or warning devices, and FIG. 13 is a longitudinal axial section showing still another embodiment of the reversing device of the present invention.

Figure 1:
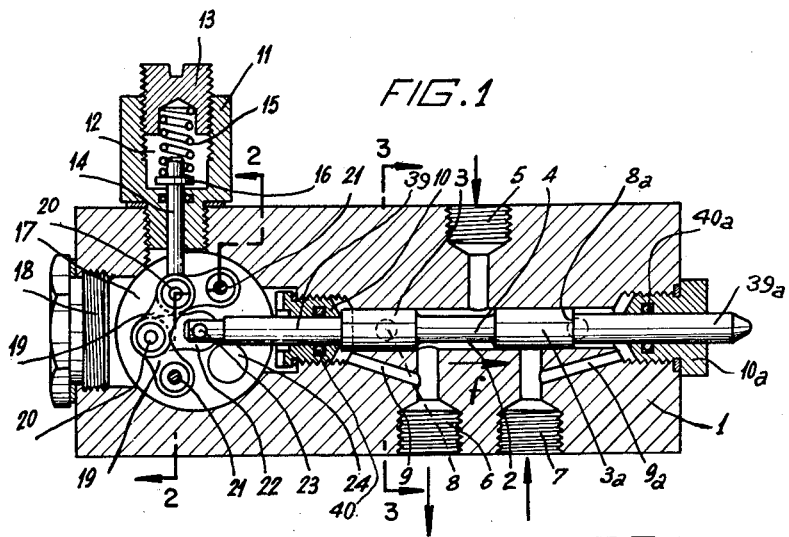
Figure 2:
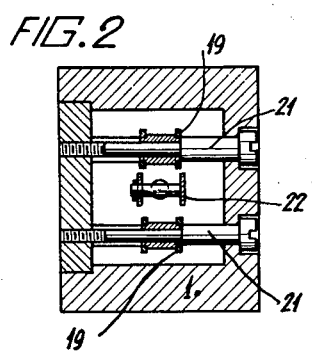
Figure 3:
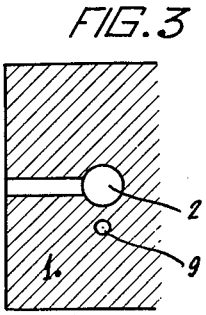

Referring now to the drawings, and in particular to FIGS. 1 to 6, the reversing device of the present invention comprises essentially a body 1 having formed therein a bore 2 slidably engaged by a slide valve formed with two piston-forming portions 3, 3a of the same diameter as the bore 2, except provision is made for the adequate play, which portions 3, 3a are formed integral with the central rod 4 of the slide valve.

In the same body 1 are formed on the other hand: an inlet duct 5 for the lubricant under pressure from the pump, additional ducts 6, 7 for feeding lubricant to each line, respectively, ducts 8, 8a leading to the reservoir, and ducts 9, 9a connecting the aforesaid ducts 6, 7, respectively, to each extremity of the bore 2, the latter being closed at either end by screw plugs 10, 10a.

In the embodiment, illustrated in the drawing, the slide valve is formed at either end with cylindrical rod extensions 39, 39a emerging from the bore 2 through the bored plugs 10, 10a, sealing packings 40, 40a being disposed in the plugs 10, 10a, to prevent any leakage from the bore 2.

On the other hand, screwed into the body 1 is a socket 11 formed with an inner chamber 12 closed by a screw-threaded plug 13 and the socket 11 receiving a rod 14 disposed at a right angle to the longitudinal axis of the slide valve and slidably fitted in a bore formed in the socket 11. A compression coil spring 15 is interposed between a shoulder or disk 16 solid with the rod 14 and the plug 13, and it is clear that the spring 15 is more or less compressed, when it is screwed in or out, The operative connection between the slide valve consisting of the pistons 3, 3a and the central rod 4 and the aforesaid rod 14 is effected as follows:

The body 1 has formed therein a chamber 17 closed by a plug 18. Pivotally mounted in the chamber 17 is a section of a roller chain which comprises in the described embodiment three links 19 connected together by pivots 20 and wherein the outer or end links are secured to pivots 21 formed by fixed pins. This chain section has pivotally connected thereto a so-called spring-link secured in turn to the pivot 23 on the projecting end of rod 39, one of the chain rollers engaging the lower end of the other rod 14.

The chamber 17 is connected through a duct 24 to a reservoir in order, on the one hand, to properly lubricate the toggle and, on the other hand, to ensure the volume balance consistent with the variable degree of emergence of the rod 39 in this chamber.

The inverter operates as follows:

In the slide-valve position shown in FIG. 1, the lubricant under pressure entering through the inlet port 5 feeds the line 6 while the other line 7 is discharged to the reservoir through the duct 9a. The pressure exerted through the duct 9 against the piston-forming portion 3 tends to move the slide valve in the direction of the arrow f (FIG. 4), but this movement cannot be performed as long as the force applied by the spring 15 on the rod 14 is sufficient therefor; it commences only when this pressure attains a predetermined value; then the slide valve will successively move to the positions shown in FIGS. 4 to 8 of the drawings.

Figure 4:
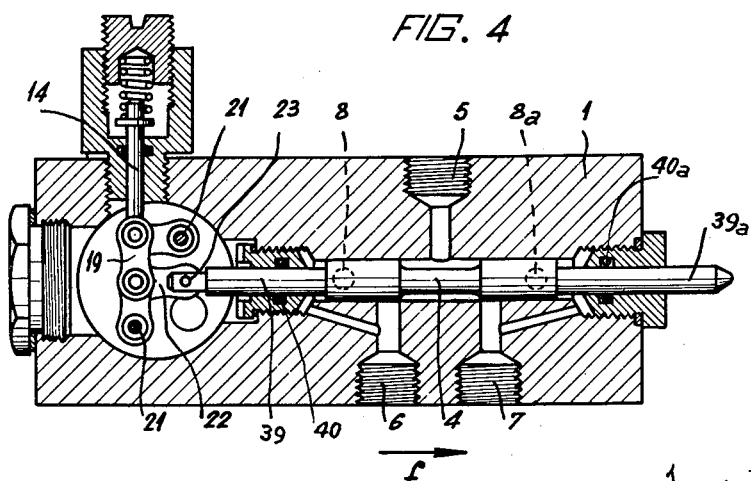

In FIG. 4, the slide valves, consisting of the members 3, 4, 3a is shown in its intermediate position and the toggle 19 is in a condition of equilibrium. The pressure remaining in line 6, the port of duct 8 in bore 2 being still closed by the slide valve, causes the slide valve to continue its movement in the direction of the arrow f.

In FIG. 5, the slide valve is shown in a position whereby the port of duct 8 in bore 2 is about to be uncovered, and the pressure is therefore about to drop in line 6. The slide valve begins to deliver lubricant through duct 9a into line 7, this being possible since this line has been discharged. But the toggle 19 has overstepped its position of equilibrium and the rod 14 urged by the spring 15 urges this toggle so as to enable the slide valve consisting of the members 3, 4, 3a to continue its travel in the direction f.

In the position of FIG. 6 the slide valve has moved to the position opposite to that shown in FIG. 1, having completed its stroke. Now it is the other line 7 that is pressurized, line 6 being discharged to the reservoir through the ducts 9 and 8.

Then, the slide valve will move in the opposite direction, and so forth.

In case the inverter were used in an arrangement comprising an automatic pump, it may happen that if the slide-valve moves too slowly to its intermediate position in which it is shown in FIG. 4, wherein no lubricant is supplied to either of lines 6, 7, an excessive overpressure will interfere with the proper operation of or even damage the device and the system, as the pump continues to deliver lubricant under pressure during this time.

In order to avoid this inconvenience, the present invention provides a safety device a first embodiment of which is illustrated in FIGS. 7 and 8, which comprises a discharge valve 25 mounted between a duct 26 leading to the bore 2 and a discharge or exhaust duct 27. This valve is definitely gauged at a pressure above that at which the inverter may be caused to operate for a given calibration of spring 15. A device of this type may advantageously be used in case the pump output is relatively low, that is, likely to be easily discharged through this duct 27.

The same applies if the range or margin of reversing pressure adjustment is relatively small and does not depart appreciably from the calibration pressure of the valve 25, which calibration may be adjusted at the proper value by screwing in or out the plug 28 acting upon the spring 29.

If we assume the opposite case, that is, when the range of adjustment defined in the preceding paragraph is relatively wide, the pressure built up by the pump might lock the slide valve in its intermediate position, and therefore another, particularly interesting embodiment of the safety device is shown in FIG. 9.

In this alternate embodiment of the safety device the body 1 of the inverter has another bore 30 formed therein which has slidably fitted therein a small additional slide valve 31 which, in its inoperative state, is maintained in its intermediate position, (shown in broken lines) by a pair of antagonistic compression springs 32, 32a of the same force. On the other hand, there is formed in the same body 1, between the ducts 6 and 7, another duct 33 interconnecting the bores 30 and 2 to constitute a by-pass.

When, in the shown position pressure is applied to line 6, the slide valve 31 is moved in the direction of the arrow f and the lubricant contained in the region of bore 30 which encloses the spring 32a will flow to the reservoir through the duct 8a which at this time is uncovered by the main slide valve 3a.

When the slide-valve member consisting of the members 3, 4, 3a of the inverter is in its intermediate position, the broken lines showing the position occupied at this time by the end faces of the two piston-forming portions 3, 3a, the slide valve 31 lies in the position shown in the FIG. 9, wherein the pressure exerted in line 6 is still applied on its left-hand face. Under these conditions the duct 33 will act as a by-pass through which the pump output may be transmitted through the ducts 6 and 9 to exert its pressure against the members 3, 4, 3a of the slide valve, so as to move the latter in the direction of the arrow f until it uncovers the orifice of duct 8. At this time the slide valve uncovers the other duct 7 through which the pump output may then be allowed to flow, this movement being completed by the action of the toggle 19 as already explained hereinabove. The additional slide valve 31 resumes its position of equilibrium until the pressure created by the pump delivering through the line 7 causes its displacement in the direction opposite to that shown by the arrow f, whereafter the same cycle of operation may be resumed.

It will be noted that the rod 39a of the main slide valve emerges from the body 1 through a bored plug 10a.

This rod extension 39a may conveniently be used for actuating an inversion recording device or simply a warning device. Thus, as shown by way of example in FIG. 10, this rod may be adapted to operate through a resilient blade 34 and a connecting member 35 a stroke or pulse counter 36, so that each one-unit increment in the visible figures of the counter indicates that an inversion took place. If desired, this rod may be caused to either strike a bell 37 (FIG. 11) or, as shown in FIG. 12, actuate an electric contact 38 controlling the energizing circuit of an electrical apparatus.

Of course, the apparatus according to the present invention is not limited to the embodiment shown and described herein. Thus, the slide valve of the apparatus may also be constructed without the end rods 39, 39a constituting its end extensions, the toggle interconnecting this slide valve and the calibrated spring being located in this case in a central chamber formed in the body.

Thus, FIG. 13 illustrates an embodiment wherein the connecting toggle consisting of the three chain links 19b is housed in a chamber 17b formed in the central portion of the body 1b of the inverter, the intermediate rod 4b of the slide valve extending through this chamber. The rod 4b is pivotally and directly connected to the toggle through the engagement of a link pin 20b in a transverse slot 20c formed in the rod 4b, the pin 20b constituting the pivotal connection between an end link 19b and the intermediate link.

The socket 11b containing the single calibrated spring 15b acting upon the rod 16b registers with the chamber 17b, the perpendicular rod 16b engaging the pivotal connection 20b between the intermediate link and the end link 19b disposed on the corresponding side.

As shown, the slide valve of this inverter is not provided with end extensions 39, 39a as in the preceding embodiments, the axial bore of the body being closed at either end by solid plugs 18b in this case.

On the other hand, the relative arrangement of the various ducts formed in the body 1b remains unchanged, except for the difference that the inlet orifice 5b opens into the chamber 17b in which the central rod 4b of the slide valve is movable. The operation of this modified inverter is the same as that of the inverters described hereinabove with reference to the other figures of the drawings.

Although the present invention has been described in conjunction with preferred embodiments, it is to be understood that modifications and variations may be resorted to without departing from the spirit and scope of the present invention, as those skilled in the art will readily understand. Such modifications and variations are considered to be within the purview and scope of the present invention and appended claims.

What I claim as new is:

1. An automatic reversing valve for central lubrication systems having two lines, comprising a body having a main bore, the latter having two open ends, a screw plug inserted in said body at each open end of said bore, a slide valve mounted in said bore for axial sliding movement and having a pair of piston forming collars axially displaceable in two separate displacement zones of said bore upon axial movement of said slide valve, a first duct disposed crosswise in said body for introducing lubricant under pressure and opening into said bore between said two displacement zones of said slide valve collars, a pair of second ducts adapted to communicate with said two lines of said central lubrication system to be fed with lubricant and each of said second ducts opening into said bore at the corresponding one of said displacement zones of said slide valve collars, a pair of third ducts adapted to communicate with a reservoir and each of said third ducts leading into said bore at the corresponding one of said displacement zones of said slide valve collars, a pair of fourth ducts, each of said fourth ducts connecting the corresponding ends of said bore with the corresponding one of said second ducts, a single gaged spring, means interconnecting said spring with said slide valve, said spring being adapted to counteract the movement of said slide valve in either axial direction upon exerting pressure by said lubricant acting on either one of said piston-forming collars substantially in the corresponding one of said end zones of said bore.

2. The automatic reversing valve, as set forth in claim 1, wherein said interconnecting means for connecting said slide valve to said single spring comprises a toggle consisting of a section of roller chain having hingedly interconnected links, the end links of said section of roller chain are pivoted on fixed pins, a rod disposed crosswise and axially movable in said body, said toggle is pivoted on said slide valve and has one link in engagement with said rod responsive to the power exerted by said gaged spring.

3. The automatic reversing valve, as set forth in claim 2, wherein said body defines an inner chamber disposed at one end of said bore, and said toggle, disposed between said slide valve and said spring, is mounted in said chamber and pivotally secured to the corresponding end of said slide valve.

4. The automatic reversing valve, as set forth in claim 2, wherein said body defines an inner chamber communicating with said bore and displosed between said two displacement zones of said slide valve collars, and said toggle interconnecting said slide valve and said spring is disposed in said chamber and is pivotally secured to said slide valve between said two piston-forming collars thereof.

5. The automtaic reversing valve, as set forth in claim 1, wherein said body has a fifth duct adapted for discharge of said lubricant and opening into said bore between said two displacement zones of said slide valve collars, and comprising a gaged valve disposed in said fifth duct in order to permit the release of said lubricant in case of overload.

6. The automatic reversing valve, as set forth in claim 1, wherein said body has an additional bore closed at its ends and communicating with said pair of second ducts, an additional slide-valve is slidably mounted in said additional bore between said second ducts, a pair of springs of substantially the same force disposed on either side of said additional slide-valve, a sixth duct connecting said main bore with said additional bore, and said sixth duct leading into said main bore between said two displacement zones of said slide valve collars and opening into said additional bore between said two second ducts, the latter communicating with said lines to be fed with said lubricant.

References Cited in the file of this patent

FOREIGN PATENTS

| 1,151,669 | France | Aug. 26, 1957 |
| 1,160,216 | France | Feb. 24, 1958 |